(12) United States Patent
Lau

(10) Patent No.: US 8,257,141 B2
(45) Date of Patent: Sep. 4, 2012

(54) ULTRASONIC CUT AND BONDED ELASTIC MATERIAL AND BRASSIERE INCLUDING SAME

(75) Inventor: Wai Ching Andy Lau, Hong Kong (HK)

(73) Assignee: Clover Group International Limited, Kowloon (HK)

( * ) Notice: Subject to any disclaimer, the term of this patent is extended or adjusted under 35 U.S.C. 154(b) by 0 days.

(21) Appl. No.: 13/160,143

(22) Filed: Jun. 14, 2011

(65) Prior Publication Data

US 2011/0281499 A1 Nov. 17, 2011

Related U.S. Application Data

(62) Division of application No. 11/860,672, filed on Sep. 25, 2007, now Pat. No. 7,972,455.

(60) Provisional application No. 60/827,423, filed on Sep. 28, 2006.

(51) Int. Cl.
*A41C 3/00* (2006.01)
(52) U.S. Cl. ............................................. 450/92; 450/93
(58) Field of Classification Search ..................... 450/92, 450/93; 2/243.1, 275; 156/73.1, 73.3, 73.4, 156/91–93, 251, 308.4
See application file for complete search history.

(56) References Cited

U.S. PATENT DOCUMENTS

| | | | | |
|---|---|---|---|---|
| 3,595,187 A | * | 7/1971 | Gray | 112/141 |
| 5,829,150 A | * | 11/1998 | McEligot | 33/562 |
| 6,070,542 A | * | 6/2000 | Wong | 112/475.09 |
| 7,972,455 B2 | * | 7/2011 | Lau | 156/73.3 |
| 2008/0081166 A1 | * | 4/2008 | Lau | 428/221 |

FOREIGN PATENT DOCUMENTS

| | | |
|---|---|---|
| EP | 1 491 105 A1 | 12/2004 |
| EP | 1491105 A1 * | 12/2004 |
| GB | 1324591 A | 7/1973 |
| JP | 8-209419 A | 8/1996 |
| JP | 11-279821 A | 10/1999 |
| JP | 2004-11056 A | 1/2004 |
| WO | WO03/003862 A1 * | 1/2003 |
| WO | WO 03/003862 A1 | 1/2003 |

* cited by examiner

*Primary Examiner* — Gloria Hale
(74) *Attorney, Agent, or Firm* — Muncy, Geissler, Olds & Lowe, PLLC

(57) ABSTRACT

A method of forming a hem of an elastic material includes laying a first stretch fabric sheet upon a second stretch fabric sheet, cutting an excess edge strip from the first stretch fabric sheet and the second stretch fabric sheet along a fuse line and simultaneously fusing the sheets together along the fuse line, positioning an elastic strip between the first and second sheets along the fuse line, and fusing the elastic strip to one of the sheets to form a hem.

8 Claims, 2 Drawing Sheets

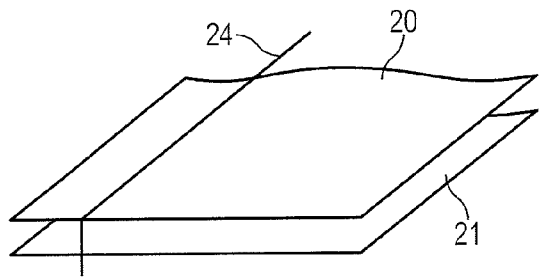
*FIG. 1*
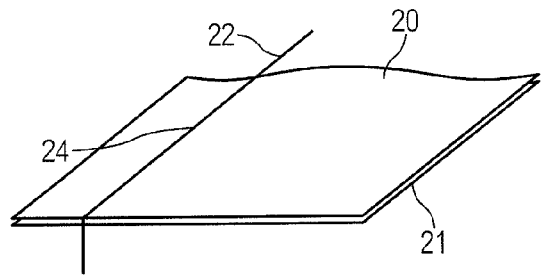
*FIG. 2*
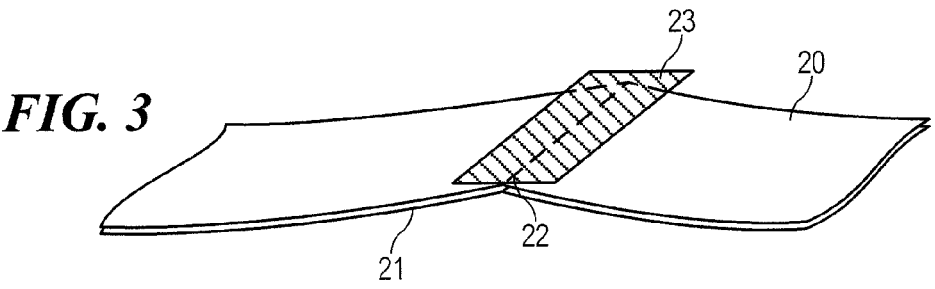
*FIG. 3*
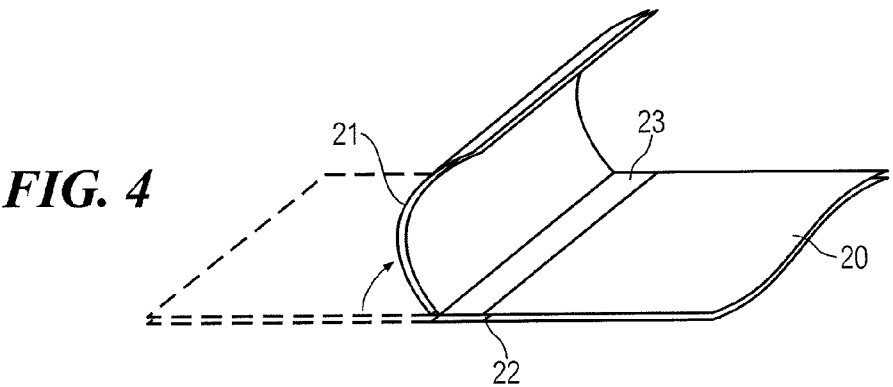
*FIG. 4*
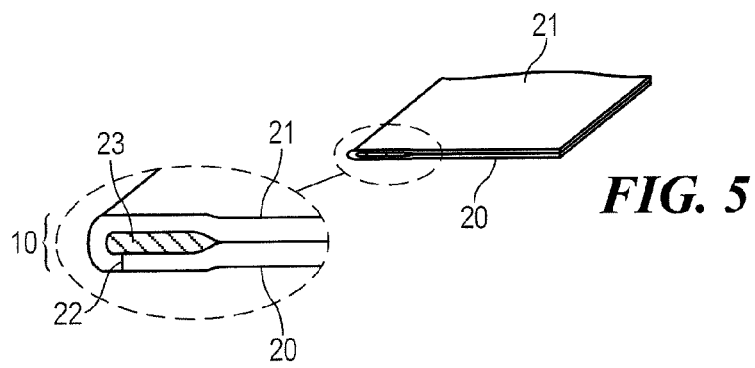
*FIG. 5*
*FIG. 6*

ULTRASONIC CUT AND BONDED ELASTIC MATERIAL AND BRASSIERE INCLUDING SAME

CROSS REFERENCE TO RELATED APPLICATION

Pursuant to 35 U.S.C. 119(e), this application is a divisional of U.S. application No. 11/860,627, which was filed on Sep. 25, 2007, now U.S. Pat. No. 7,972,455, and which claims priority to U.S. Provisional Application No. 60/827,423, filed Sep. 28, 2006, the contents of which are hereby incorporated herein by reference.

BACKGROUND

Elastic materials are used in clothing, particularly in undergarments. In one example, a "wing" refers to the segment of a brassiere that extends from each cup, under the shoulders, to the back strap. A brassiere has two such elastic wings, with one at each side. Traditionally, elastic wings comprise three layers of material, which includes a layer of elastic material sandwiched between a pair of stretch fabric layers. All three layers are stitched along an edge, with one of the stretch fabric layers flipped over and around the edge to conceal the stitching and to provide a hem that is five-layer thick. Brassieres and other garments made using this method are cumbersome in appearance, because such thick hems are readily visible through outer garments. Consequently, it is desirable to provide an improved elastic material that has a thinner hem and that is less cumbersome in appearance. It is also desirable to provide a method of ultrasonically cutting and bonding an elastic material.

SUMMARY

According to one aspect, a method of forming a hem of an elastic material includes laying a first stretch fabric sheet upon a second stretch fabric sheet, cutting an excess edge strip from the first stretch fabric sheet and the second stretch fabric sheet along a fuse line and simultaneously fusing the sheets together along the fuse line, positioning an elastic strip between the sheets and along the fuse line, and fusing the elastic strip to at least one of the sheets to form the hem.

According to another aspect, a hem of an elastic material includes first and second stretch fabric sheets, and an elastic strip fused to at least one of the stretch fabric sheets. The first and second stretch fabric sheets completely encase the elastic strip.

BRIEF DESCRIPTION OF THE DRAWINGS

FIG. 1 depicts the first step of a method of making a hem of an elastic material.

FIG. 2 depicts the second step of the method of making a hem of an elastic material.

FIG. 3 depicts the third step of the method of making a hem of an elastic material.

FIG. 4 depicts the fourth step of the method of making a hem of an elastic material.

FIG. 5 depicts the fifth step of the method of making a hem of an elastic material.

FIG. 6 depicts an enlarged view of the hem of FIG. 5.

DETAILED DESCRIPTION

Figure 7:
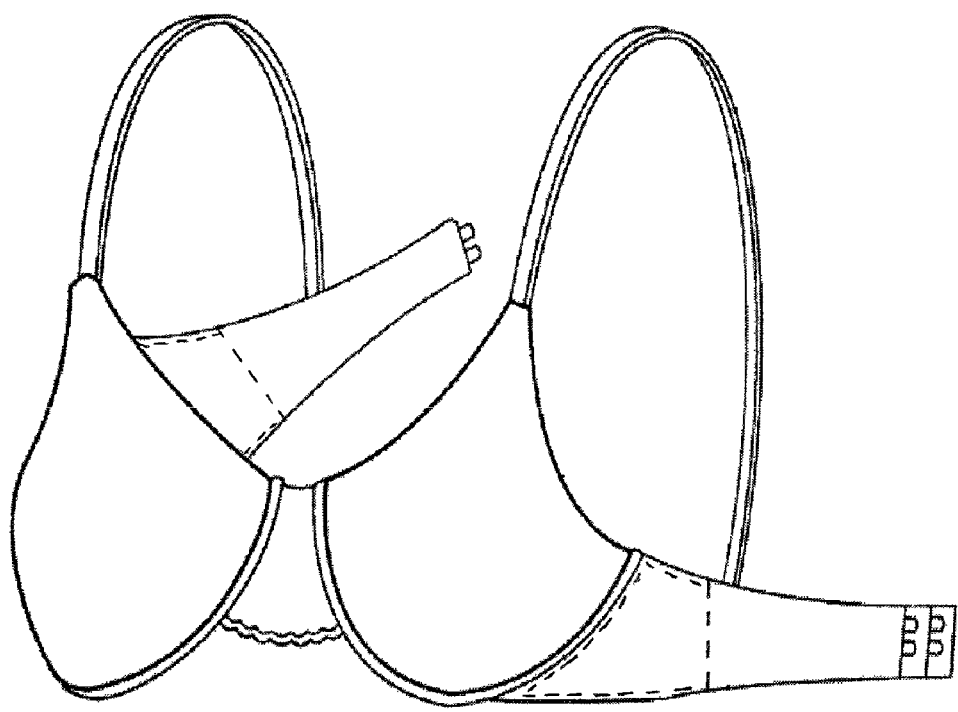
FIG. 7 depicts a brassier including the hem of FIG. 6.

Reference will now be made in detail to a particular embodiment of the invention, examples of which are also provided in the following description. Exemplary embodiments of the invention are described in detail, although it will be apparent to those skilled in the relevant art that some features that are not particularly important to an understanding of the invention may not be shown for the sake of clarity.

Furthermore, it should be understood that the invention is not limited to the precise embodiments described below and that various changes and modifications thereof may be effected by one skilled in the art without departing from the spirit or scope of the invention. For example, elements and/or features of different illustrative embodiments may be combined with each other and/or substituted for each other within the scope of this disclosure and appended claims. In addition, improvements and modifications which may become apparent to persons of ordinary skill in the art after reading this disclosure, the drawings, and the appended claims are deemed within the spirit and scope of the present invention.

A method of forming a hem 10 of an elastic material includes laying a first stretch fabric sheet 20 upon a second stretch fabric sheet 21, cutting an excess edge strip from the first stretch fabric sheet 20 and the second stretch fabric sheet 21 along a fuse line 22 and simultaneously fusing the sheets 20 and 21 together along the fuse line 22, positioning an elastic strip 23 between the first and second sheets 20 and 21 along the fuse line 22, and fusing the elastic strip 23 to at least one of the sheets 20 or 21 to form a hem 10, as depicted in FIGS. 1 to 6.

In the first step, the first stretch fabric sheet 20 and the second stretch fabric sheet 21 are laid upon one another, as depicted in FIG. 1. Examples of the stretch fabric sheet may include Polyester, Spandex, and Lycra. A single needle stitch line 24 may be formed adjacent to the edge of the sheet 20 and 21 to join the sheets 20 and 21 together. For example, the stitch line 24 may be from 2 to 3 mm from the edge of the sheets 20 and 21.

In the second step, cutting and fusing may be performed along line 24 to join the sheets 20 and 21 together, as depicted in FIG. 2. For example, an ultrasonic cutting machine may be used, although other machines known to one skilled in the art may also be used, to ultrasonically cut a 6 mm seam allowance and at the same time ultrasonically fuse the sheets 20 and 21 together. Preferably, the first 20 and second 21 stretch fabric sheets are ultrasonically fused together along the fuse line 22.

In the third step, the elastic strip 23 is positioned between the connected sheets 20 and 21 along the fuse line 22. In one example, the connected sheets 20 and 21 may be opened flat to form a continuous sheet, as depicted in FIG. 3. An elastic strip 23 may then be laid upon the fuse line 22. For example, the elastic strip 23 may be a heat-fusible elastic material, such as Polyester, Spandex, Lycra or combinations thereof. The sheet 21 may be folded about the elastic strip 23 to sandwich the elastic strip 23 between the sheets 20 and 21, as depicted in FIG. 4. Preferably, the folding maintains the fuse line 22 at one side of the elastic strip 23.

In the fourth step, the elastic strip 23 may be fused to at least one of the sheets 20 or 21 to form the hem 10, as depicted in FIGS. 5 and 6. Preferably, the elastic strip 23 is fused to both the first 20 and second 21 stretch fabric sheets. Preferably, the sheets 20 and 21 are turned inside out before fusing. A heat-fusing machine, a heated presser foot machine or a conveyor belt machine may be used to fuse the elastic strip 23 to one or both stretch fabric sheets 20 or 21, although other machines known to one skilled in the art may also be used.

The hem 10 of an elastic material includes the first 20 and second 21 stretch fabric sheets, and the elastic strip 23 fused to at least one stretch fabric sheet 20 or 21. The first 20 and second 21 stretch fabric sheets completely encase the elastic strip 23. Therefore, the hem 10 may have only three-layers. An elastic wing may include the hem 10 at an edge thereof. A brasserie, illustrated in FIG. 7. may include a first cup, a second cup, a back strap, a first elastic wing between the first cup and the back strap, and a second elastic wing between the second cup and the back strap.

It should be appreciated that modifications and alterations obvious to those skilled in the art are not to be considered as beyond the scope of the present invention. For example, the single line stitching step may be omitted. Furthermore, it should be known that the present invention is not limited to "wings", as it may apply equally to other clothing parts or to other elastic materials.

While the examples of the methods and products have been described, it should be understood that the methods and products are not so limited, and modifications may be made. The scope of the method and products is defined by the appended claims, and all methods and products that come within the meaning of the claims, either literally or by equivalence, are intended to be embraced therein.

What is claimed is:

1. A brassiere, comprising:
   a first breast cup;
   a second breast cup;
   a back strap;
   a first elastic wing between the first breast cup and the back strap; and
   a second elastic wing between the second breast cup and the back strap;
   wherein the first and second elastic wings each comprise a hem; the hem including:
      a first stretch fabric sheet and a second stretch fabric sheet, and an elastic strip fused to at least one of the stretch fabric sheets,
   wherein the elastic strip is sandwiched between the stretch fabric sheets, and wherein the second stretch fabric sheet is folded about the elastic strip, and an excess edge strip from both stretch fabric sheets is ultrasonically cut along a fuse line to thereby simultaneously ultrasonically fuse the stretch fabric sheets together along the fuse line and remove a stitch line formed adjacent to an edge of the stretch fabric sheets for joining the stretch fabric sheets together.

2. A hem formed at an edge of an elastic material at an edge of a breast cup of a brassiere, comprising:
   a first stretch fabric sheet laid upon a second stretch fabric sheet; and
   an elastic strip laid between the first and second stretch fabric sheets and sandwiched between the stretch fabric sheets by folding the second stretch fabric sheet about the elastic strip, and the elastic strip being fused to at least one of the stretch fabric sheets to form the hem,
   wherein an excess edge strip from both stretch fabric sheets is ultrasonically cut along a fuse line to thereby simultaneously ultrasonically fuse the stretch fabric sheets together along the fuse line and remove a stitch line formed adjacent to an edge of the stretch fabric sheets for joining the stretch fabric sheets together.

3. The hem of claim 2, wherein the stitch line is about 2 to about 3 mm from the edge of the stretch fabric sheets.

4. The hem of claim 2, wherein the ultrasonically cutting and ultrasonically fusing are performed by an ultrasonic machine.

5. The hem of claim 4, wherein the ultrasonic cutting provides about a 6 mm seam allowance.

6. The hem of claim 2, wherein the folding of the second stretch fabric sheet maintains the fuse line at one side of the elastic strip.

7. The hem of claim 2, wherein the elastic strip is fused to both stretch fabric sheets.

8. The hem of claim 7, wherein the elastic strip is fused using a heated presser foot machine.

* * * * *